(12) United States Patent
Keskikangas et al.

(10) Patent No.: US 10,778,909 B2
(45) Date of Patent: Sep. 15, 2020

(54) SPLITTING OF A WIDE ANGLE VIEW

(71) Applicant: Axis AB, Lund (SE)

(72) Inventors: Axel Keskikangas, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/186,137

(22) Filed: Nov. 9, 2018

(65) Prior Publication Data

US 2019/0149747 A1    May 16, 2019

(30) Foreign Application Priority Data

Nov. 15, 2017 (EP) ..................... 17201842

(51) Int. Cl.
| | |
|---|---|
| *H04N 5/262* | (2006.01) |
| *G08B 13/196* | (2006.01) |
| *G06T 3/00* | (2006.01) |
| *G06T 7/70* | (2017.01) |
| *G06T 7/11* | (2017.01) |
| *G06T 7/80* | (2017.01) |
| *H04N 5/232* | (2006.01) |

(Continued)

(52) U.S. Cl.
CPC ......... *H04N 5/2624* (2013.01); *G06T 3/0062* (2013.01); *G06T 7/11* (2017.01); *G06T 7/20* (2013.01); *G06T 7/70* (2017.01); *G06T 7/80* (2017.01); *G08B 13/196* (2013.01); *G08B 13/19628* (2013.01); *H04N 5/232* (2013.01); *H04N 5/23238* (2013.01); *H04N 7/18* (2013.01); *G06K 9/00771* (2013.01)

(58) Field of Classification Search
None
See application file for complete search history.

(56) References Cited

U.S. PATENT DOCUMENTS

| | | | |
|---|---|---|---|
| 2008/0118161 A1 | 5/2008 | Liu et al. | |
| 2010/0158386 A1* | 6/2010 | Smilansky | G01F 22/00 382/194 |

(Continued)

FOREIGN PATENT DOCUMENTS

| | | |
|---|---|---|
| CN | 102955929 A | 3/2013 |
| EP | 2469470 A1 | 6/2012 |

(Continued)

OTHER PUBLICATIONS

Chesapeake & Midlantic Marketing, "360/180 Panoramic Camera Tech," (Jul. 2017).

(Continued)

*Primary Examiner* — Xiaolan Xu
(74) *Attorney, Agent, or Firm* — Volpe and Koenig, P.C.

(57) ABSTRACT

A method for splitting a wide angle view of a scene into a plurality of display views is provided. The wide angle view is captured by a wide angle lens camera. The method comprises detecting, over time, objects in the scene; determining positions of the detected objects; determining one or more areas of interest within the scene based on the determined positions of the objects; and determining splitting boundaries for the plurality of display views in the wide angle view such that the splitting boundaries avoids the one or more areas of interest. A monitoring camera having a wide angle lens is also provided.

13 Claims, 4 Drawing Sheets

(51) Int. Cl.
*G06T 7/20* (2017.01)
*H04N 7/18* (2006.01)
*G06K 9/00* (2006.01)

(56) References Cited

U.S. PATENT DOCUMENTS

| | | | |
|---|---|---|---|
| 2013/0057546 A1* | 3/2013 | Watanabe | G06T 3/4038 |
| | | | 345/419 |
| 2014/0267452 A1* | 9/2014 | Wakabayashi | G09G 3/3614 |
| | | | 345/690 |
| 2015/0161474 A1* | 6/2015 | Jaber | G06K 9/52 |
| | | | 382/203 |
| 2015/0220789 A1* | 8/2015 | Wood | G06K 9/00711 |
| | | | 382/103 |
| 2017/0099461 A1 | 4/2017 | Nimri et al. | |
| 2017/0255836 A1* | 9/2017 | Shih | G06T 3/0018 |
| 2017/0323376 A1* | 11/2017 | Glaser | G06Q 30/0643 |

FOREIGN PATENT DOCUMENTS

| | | |
|---|---|---|
| EP | 2574036 A1 | 3/2013 |
| KR | 20160076954 A | 7/2016 |

OTHER PUBLICATIONS

Atria Logic, "Dewarping & Panorama Generation from Fisheye Images," (May 2017).
VDG Security, "Dewarping a Fisheye 360 Degree Camera," (May 2017).
Extended European Search Report dated Apr. 26, 2018 for the European Patent Application No. 17201842.6.

* cited by examiner

SPLITTING OF A WIDE ANGLE VIEW

FIELD OF INVENTION

The present disclosure relates to splitting a wide angle view into a plurality of display views.

BACKGROUND

Cameras sometimes comprises a wide angle lens for capturing images or video covering a relatively large scene, for example, an entire room. One example of a wide angle lens is a so called fisheye lens. However, other types of wide angle lenses may also be used. The ability to capture a relatively large scene is advantageous in many cases, for example during monitoring using a monitoring camera. However, it may be difficult for a user to view images captured using a wide angle lens. This since parts of the image may be distorted. It is known to apply a dewarping filter to the captured image information and thereby correct the deformed image so that objects in the images look as we as humans are used to see them. Hence, using a wide angle lens and dewarping allows covering a wide area with a single camera, but also to have a "normal" view of the otherwise distorted image view. In many implementations, before dewarping the wide angle view, the wide angle view is to be divided into a plurality of sub-views, or display views. Typically, dividing the wide angle view into the plurality of display views is hardcoded into the device dividing the wide angle view into the display views. Hence, at installation, the installer needs to align the camera physically to get suitable display views. Hence, there is a need for improvements in splitting a wide angle view of a scene into a plurality of display views.

SUMMARY

In view of the above, it is an object of the present teachings to provide a way of splitting a wide angle view of a scene into a plurality of views.

According to a first aspect, a method for splitting a wide angle view of a scene into a plurality of display views is provided. The wide angle view is captured by a wide angle lens camera. The method comprises: detecting, over time, objects in the scene; determining positions of the detected objects; determining one or more areas of interest within the scene based on the determined positions of the objects; and determining splitting boundaries for the plurality of display views in the wide angle view such that the splitting boundaries avoid the one or more areas of interest.

The wording "wide angle view" shall be construed as a view captured using a wide angle lens having an angle of view larger than 55°. For some specific embodiments a wide angle lens having an even a larger angle of view may be advantageously used. For example, a so called fisheye lens having an angle of view of 180° (both vertically and horizontally) may be used.

The wording "display view" shall be construed as a portion of the wide angle view. Typically, the display view is displayed for a user, for example an operator of a monitoring system.

The wording "splitting boundary" shall be construed as a boundary in the wide angle view that is defining a portion of the wide angle view confining a display view. The splitting boundaries for the plurality of display views may or may not overlap. Hence, at least some of the plurality of display views may overlap. Further, the plurality of display views may not overlap.

According to the present method adjustment of the splitting of the wide angle view into the plurality of display views is made possible. This without any need of physically turning the camera at or after installation of the camera. Hence, an efficient and time saving calibration of installing a wide angle viewing camera is achieved. Further, splitting boundaries may be determined such that an area of interest is not being split. Hence, splitting interesting portions in the wide angle view into two or more display views are avoided. This will make it easier for a person viewing the display views to detect actions depicted by therein. This since the probability of an action is just going on in one of the display views is increased. Further, the present method makes it possible to spend more data bits on encoding display views comprising areas of interest than display view without areas of interest. Moreover, the overall bandwidth for the plurality of display view may be saved. This since display view having none or very few objects detected therein may be encoded using less data bits.

The act of detecting objects in the scene may comprise detecting motion in the scene. The motion may for example be detected using a motion detecting algorithm. Various motion detecting algorithms are well known to a person skilled in the art and will not be further discussed herein.

The act of detecting objects in the scene may comprise recognition of objects in the scene. By recognition of an object is meant to identify characteristic of an object. The characteristics of an object may be used for classifying the detected object, hence, to put the detected object into a class of objects. The recognition of objects may be made using an object recognition algorithm. Such a recognition may lead to that the type of object is identified, for example, a car, a human, or a cat. Alternatively, or in combination, the recognition of objects may be made using an action recognition algorithm. Such a recognition may lead to that the activity the detected object is performing is identified, for example, running, walking, fighting, standing, or looking at a specific region or spot. This allows for adapting the splitting boundaries depending on the recognized object. Various object recognition algorithms are well known to a person skilled in the art and will not be further discussed herein. Further, various action recognition algorithms are well known to a person skilled in the art and will not be further discussed herein.

The act of determining an area of interest may comprise determining an overall density distribution of positions of objects within the scene, and defining an area of interest as an area having a density of positions of object above a threshold value. In other words, if one area of the scene comprises a number of objects above a threshold, this is an area of interest. The splitting boundaries may be adapted to these areas.

In case the act of detecting object in the scene comprises recognition of objects in the scene. The method may further comprise attributing each detected object with an object type among a number of predetermined object types based on the recognition of objects in the scene and allocating a weight to a respective detected object based on the object type for the respective detected object. The act of determining the overall density distribution may further be based on the weights of the objects. In this way certain recognized objects may be prioritized compared to other objects. This enables a dynamic aspect to the splitting of the wide image view into the plurality of display views.

The act of determining splitting boundaries in the wide angle view may further be performed such that a center of gravity of a local density distribution of positions of objects within a specific display view is centered in the specific display view. Thus, if the density distribution is centered in the display view it will be further safeguarded that actions happening in a scene captured by the wide angle lens camera will not cover more than one display view. This since the possibility of that an object depicted in the display view will be close to or even cut by the boarder of the display view is reduced.

The act of detecting objects in the scene may be performed for at least 15 min. Even longer time period may be used, for example, up to several days. Further, the act of detecting may be performed for preset periods of a day. For example, if the scene is a store, the act of detecting may be performed during opening hours only. In summary, the act of detecting may be performed for a period of time such that a statistical sample of detected objects is high enough so that the act of determining splitting boundaries for the plurality of display views may be performed.

The method may further comprise determining a time of occurrence for respective one of the detected objects. The act of determining splitting boundaries in the wide angle view may further be performed by taking into account the respective time of occurrence for the detected objects, and by targeting that occurrences of detected objects may be simultaneous in least possible display views. Thus, the splitting boundaries may be adjusted to have detected objects occurring at the same time within least possible display views. By this optimization of the coding of the display views may be performed. For example, it is made possible to spend more data bits on encoding display views comprising areas of interest than display view without areas of interest. Further, the overall bandwidth for the plurality of display view may be saved. This since display view having none or very few objects detected therein may be encoded using less data bits.

The method may further form part of a calibration mode of the camera, wherein the camera may be set to be in the calibration mode during a predetermined time period. The predetermined time period may be at least 15 minutes. Even longer time period may be used, for example, up to several days. Further, the camera may be set to be in the calibration mode for preset periods of a day. For example, if the scene is a store the act of detecting may be performed during opening hours only. In summary, the calibration may be performed for a period of time such that a statistical sample of detected objects is high enough so that the act of determining splitting boundaries for the plurality of display views may be performed.

The method may form part of a calibration mode of the camera. The camera may be set to be in the calibration mode until a predetermined number of activities has been detected or until a predetermined number of activities has been detected within a potential area of interest. By this a statistical sample of detected objects is high enough so that the act of determining splitting boundaries for the plurality of display views may be performed. The camera may further be set in the calibration mode for preset periods of a day.

The plurality of display views may be at least three. The display views may for example be four.

The method may further comprise dewarping the display views and displaying the dewarped display views. Dewarping refers to the process of perspective correction of a wide angle view image, to reverse the effects of geometric distortions caused by the wide angle lens. The geometric distortions caused by the wide angle lens are typically known for a specific wide angle lens, this is typically referred to as lens distortion data for the wide angle lens. In other words, dewarping may mathematically correct the deformed image of the wide angle lens. For example, curved lines may appear straight again. Hence, image quality may be improved. Dewarping allows to cover a wide area with a camera, but also to have a "normal" view of an otherwise distorted image.

According to a second aspect a monitoring camera having a wide angle lens and being configured to perform the above method is provided.

A further scope of applicability of the present teachings will become apparent from the detailed description given below. However, it should be understood that the detailed description and specific examples, while indicating embodiments of the present teachings, are given by way of illustration only, since various changes and modifications within the scope of the present teachings will become apparent to those skilled in the art from this detailed description.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

A more detailed understanding may be had from the following description, given by way of example in conjunction with the accompanying drawings where.

As illustrated in the figures, the sizes of regions are exaggerated for illustrative purposes and, thus, are provided to illustrate the general structures of embodiments. Like reference numerals refer to like elements throughout.

DETAILED DESCRIPTION

The present teachings will now be described more fully hereinafter with reference to the accompanying drawings, in which embodiments of the present teachings are shown. The present teachings may, however, be embodied in many different forms and should not be construed as limited to the embodiments set forth herein; rather, these embodiments are provided for thoroughness and completeness, and to fully convey the scope of the present teachings to the skilled person.

Figure 1:
FIG. 1 illustrates a wide angle view captured using a fisheye lens.

In FIG. 1, a wide angle view 10 captured by a monitoring camera is illustrated. A monitoring camera comprising a wide angle lens, in this particular example a fisheye lens, has been used for capturing the wide angle view 10. When observing a scene from above, for example, from a ceiling, a wide angle lens may be used for acquiring images covering a whole scene. The angle of view for the wide angle lens used for covering a scene depends on the area of the scene and on at what distance above the scene the wide angle lens camera is placed. For example, a wide angle lens camera having an angle of view (both vertically and horizontally) within the range of 90°-180° may easily cover a rather large scene even from a distance above the scene of a few meters or above. When observing a scene from a side, for example, from a wall, a wide angle lens having an angle of view, at least in the horizontal plane, of 180° may cover a whole scene, for example, in the form of a corridor. Examples of wide angle views are a panoramic view, a fish eye view and an overview view.

Figure 2:
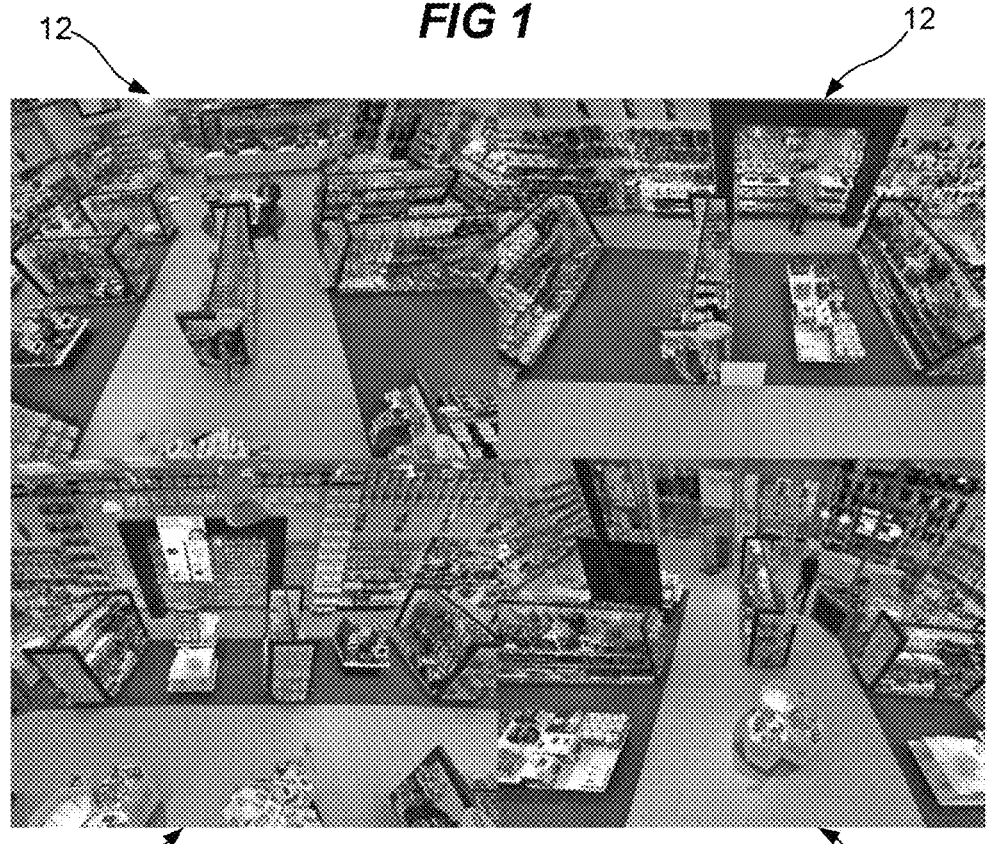
FIG. 2 illustrates dewarped display views of the wide angle view of FIG. 1.

In FIG. 1, the wide angle view 100 is a wide angle view captured using a fisheye lens. Far out at the edge of the wide angle view, the image is distorted. Hence, it is difficult to see what is shown. The wide angle view may comprise different areas of interest. The areas of interest may be used for determining how to split the wide angle view into a plurality of display views. Hence, the wide angle view may be split into a plurality of display views. An example of such a split is illustrated in FIG. 2. In this example the wide angle view 10 of FIG. 1 has been split into four different display views 12. Also a dewarping filter have been applied to image data of the display views. The dewarping filter may be individually applied to image data of each of the display views of the wide angle view 10 after the splitting. An advantage of this is that the dewarping may not necessarily be performed on all image data. Alternatively, the dewarping filter may be applied to image data of wide angle view before splitting it into the display views 12. An advantage of this is that it makes it easier to perform the object detection. The plurality of display views 12 may be three, four or even more display views. The number of display views 12 may be chosen based on the number of areas of interest in the wide angle view 10.

Figure 3:
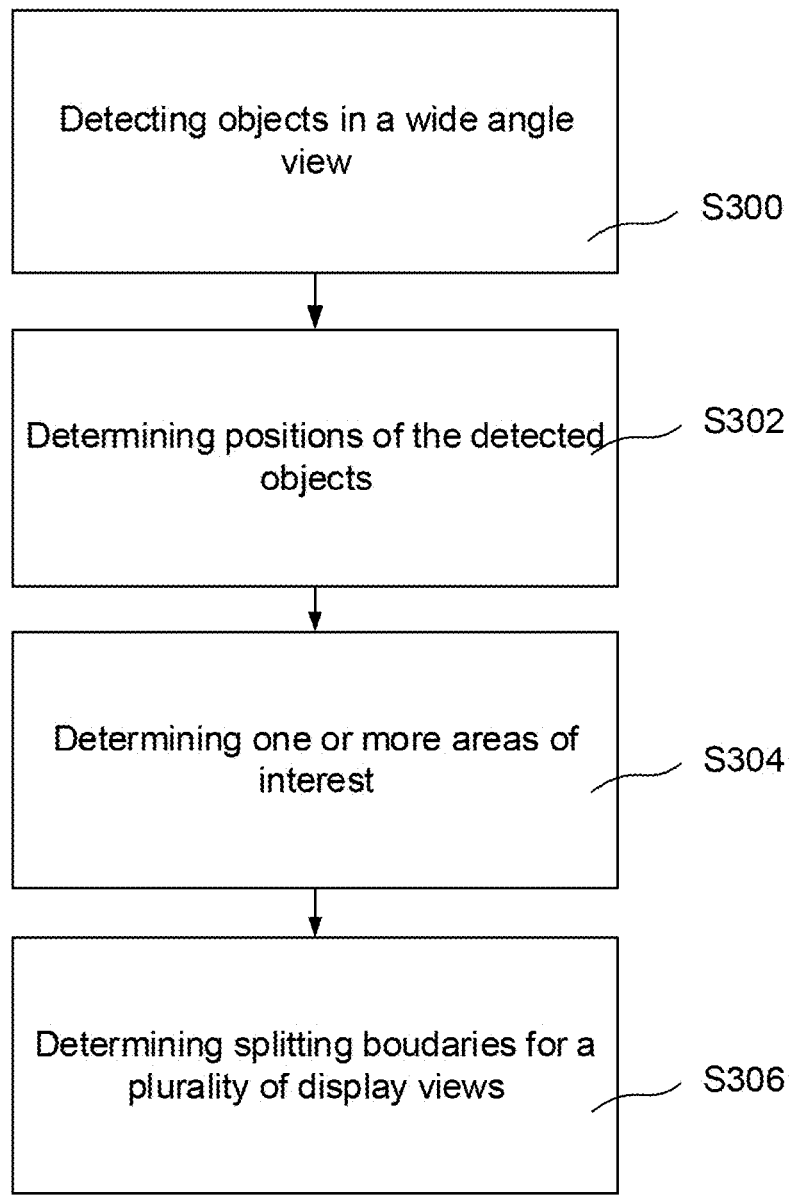
FIG. 3 is a block scheme of a method for splitting a wide angle view of a scene into a plurality of display views.

With reference to FIG. 3 a method of splitting a wide angle view of a scene into a plurality of display views will be discussed. Objects in the wide angle view are detected S300. An object should be construed as something of interest in the scene. An object could for example be an object entering or moving around in the scene depicted in the wide angle view. An object may also, or alternatively, be a stationary object in the scene. The stationary object being of specific interest. Such an object of specific interest may, for example, be a door, an entrance, a showcase, a conveyer belt, a staircase, etc. Hence, static image analysis may be used for detecting positions of important portions of the scene. Objects may be detected by detecting motion of objects with, for example, a motion detecting algorithm. Detecting objects may also include recognition of objects in the scene. The recognition of objects may be made using an object recognition algorithm and/or an action recognition algorithm. Further, the method may comprise attributing each detected object with an object type among a number of predetermined object types. The attributing may be based on the recognition of objects in the scene. Each respective detected object may be allocated a weight. The weight may be based on the object type for the respective detected object. In this way an object attributed as an object of a first specific object type being of high interest may be attributed a higher weight than another object attributed as an object of a second specific object type being of less interest.

The act of detecting objects is preferably performed over time. Hence, the act of detecting objects in the scene may be performed for a period of time. The period of time may be a predetermined period of time. Alternatively, the period of time may be dynamic. For example, the period of time may be based on a total number of detected objects. By detecting, over time, objects in the scene, statistics about where objects most often appear in the scene may be collected. This statistic may later be used for determining how to split a wide angle view of a scene into a plurality of display views.

Positions, within the scene, of the detected objects are determined S302. A position within the scene may for example be represented as a coordinate within the scene.

One or more areas of interest are determined S304. The determination of the one or more areas of interest is based on the determined positions of the objects. The act of determining an area of interest may comprise determining an overall density distribution of positions of objects within the scene, and defining an area of interest as an area having a density of positions of objects above a threshold value. The act of determining the overall density distribution may further be based on the weights of the objects. Hence, objects may be prioritized differently, depending on their object type, upon determining the areas of interest.

Splitting boundaries for the plurality of display views in the wide angle view are determined S306. The splitting boundaries are determined such that the splitting boundaries avoid the one or more areas of interest. In other words, the splitting boundaries for each display view need to be around the areas of interest and not across, over or on the areas of interest. As an example it would be undesirable to apply a split boundary just over an area of interest, for example, across an area where a lot of objects have been detected Further, the act of determining splitting boundaries in the wide angle view may be performed such that a center of gravity of a local density distribution of positions of objects within a specific display view is centered in the specific display view. By determining the splitting boundaries in accordance with the above a splitting of the wide angle view may be made such that an area of interest is not present in a division between two display views.

The splitting boundaries in the wide angle view may be determined such that a center of gravity of a local density distribution of positions of objects within a specific display view may be centered in the specific display view. Hence, areas of interest in the wide angle view will be more centered in the display views.

The image data of a respective split view may further be dewarped. As mentioned above by applying dewarping, perspective correction of a wide angle view image, to reverse the effects of geometric distortions caused by the wide angle lens is achieved.

Figure 4:
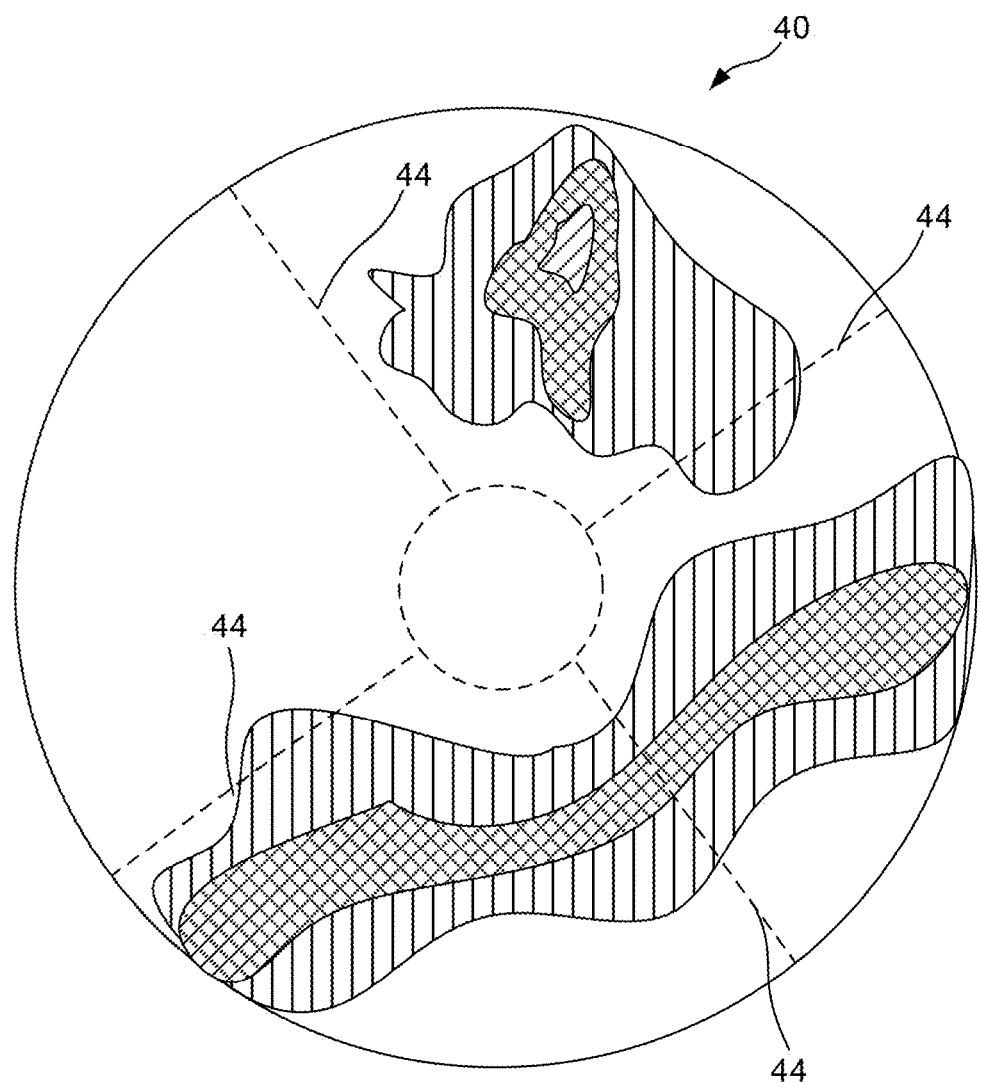
FIG. 4. illustrates an example of a heat map illustrating detected objects within a wide angle view.

FIG. 4 illustrates a heat map 40 of detected objects within a wide angle view of a monitored scene. The heat map is a two-dimensional projection of the wide angle view wherein a density of detected objects is illustrated. As discussed above, the detected object may be either a stationary object or a moving object. Further, also as discussed above, objects being of different object types may be given a different weight in the heat map. Objects being given an extra weight may, for example, be an entrance, a door, a stairway or other objects in the scene indicative of that people are likely to appear at that section of the scene. The heat map of FIG. 4 is just an example of a heat map. Different scenes may give different heat maps. Further, typically different colors are used for indicating areas of different density. However, in the in FIG. 4 shown example different patterns are instead used to indicate areas of different density.

Further, the heat map may look differently at different periods of time, for example, different periods time of a day (night vs day), different days of the week (weekdays vs. weekends), different periods of a year (summer vs winter), etc. Hence, different splitting boundaries 44 may be used for different periods of time. Accordingly, the act of determining splitting boundaries in the wide angle view may be performed by taking into account the respective time of occurrence for the detected activities. This may be performed by defining splitting boundaries such that occurrences of detected activities is simultaneous in least possible split views. Hence, areas of interest without strong temporal correlation may be determined. This will lead to that occurrences of objects in one display view will not overlap in time with occurrences of objects in another display view. Hence, if there is a strong temporal correlation between detected objects these may be surrounded with one splitting boundary delimiting one display view. By this, bandwidth or storage may be saved due to that a display view not including objects may be encoded to a lesser size than a view with objects.

The above mentioned method for splitting a wide angle view of a scene into a plurality of display views may form part of a calibration mode of a wide angle lens camera. The calibration mode may be run during a predetermined time period. The predetermined time period may be at least 15 min. Even longer time period may be used, for example, up to several days. Further, the camera may be set to be in the calibration mode for preset periods of a day. For example, if the scene is a store the act of detecting may be performed during opening hours only. The calibration may be performed for a period of time such that a statistical sample of detected objects is high enough so that the act of determining splitting boundaries for the plurality of display views may be performed. The camera may alternatively be in calibration mode until a predetermined number of objects has been detected or until a predetermined number of objects has been detected within a potential area of interest. If, for example, a predetermined number of cars have been detected on a road and/or during a specific time period, the splitting boundaries may be determined for display views for a time period and no more calibration of the splitting boundaries needs to be done.

The calibration of the splitting boundaries enables that display views may be optimized to areas of interest.

Figure 5:
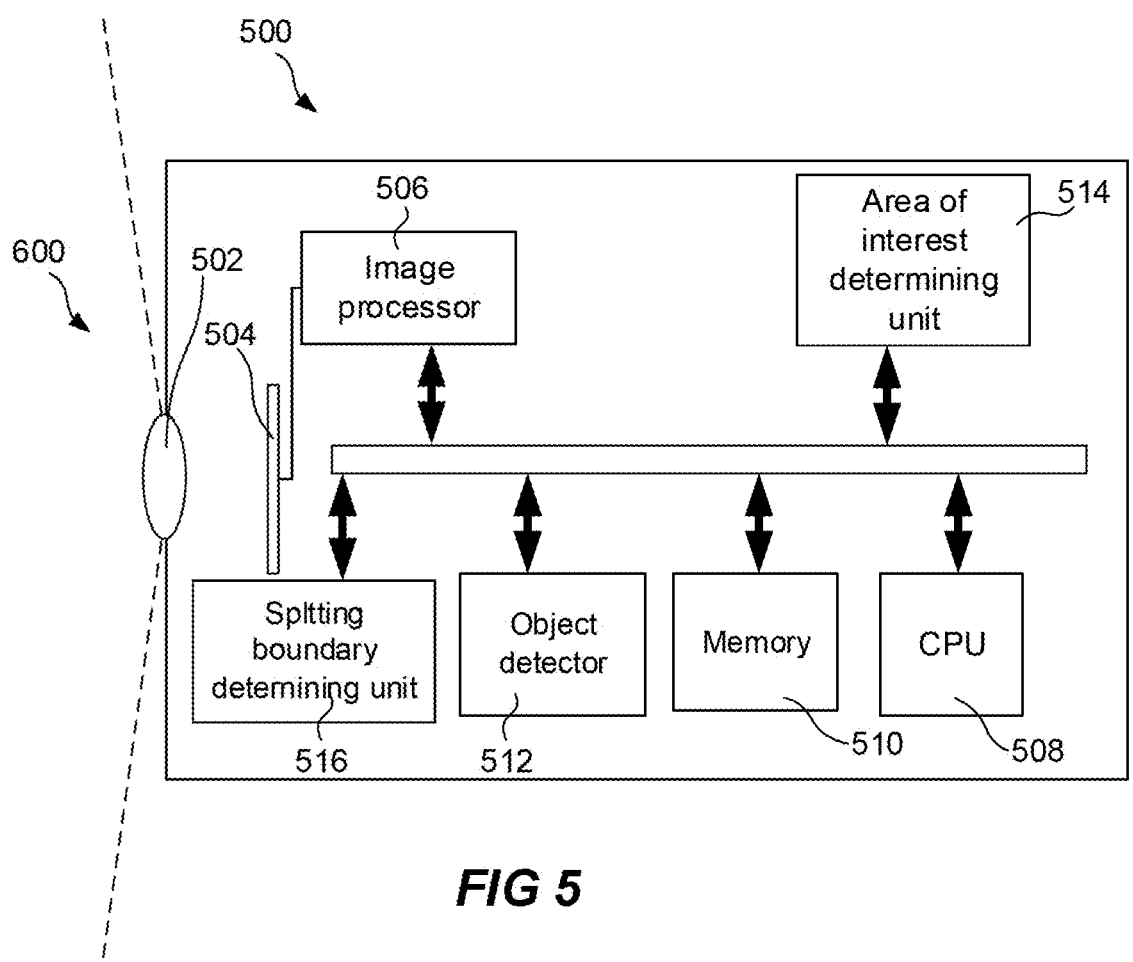
FIG. 5 illustrates a monitoring camera configured to perform the method illustrated in FIG. 3.

In FIG. 5 a monitoring camera 500 comprising a wide angle lens 502 is illustrated. The monitoring camera 500 is covering a wide angle of view 600. The monitoring camera 500 is arranged to capture and process (and possibly also store) a video sequence depicting the wide angle of view 600. For this the monitoring camera 500 comprises an image sensor 504, an image processing unit 506, a processing unit, CPU, 508 and a digital data storage medium (memory) 510. The monitoring camera 500 further comprises an object detector 512, an area of interest determining unit 514, a splitting boundary determining unit 516.

Any one of the image processing unit 506, the object detector 512, the area of interest determining unit 514, and/or the splitting boundary determining unit 516 may be implemented as a dedicated hardware circuit and/or software module. In case of being software implemented the software may be run on the CPU 508. The CPU 508 may be any suitable CPU for performing digital data processing, such as a GPU, FPGA or ASIC. It shall also be noted that any dedicated hardware circuit may in part comprise software portions being run on a dedicated processor or on the CPU 508.

The memory 510 may be any kind of volatile or non-volatile memory. Further, the memory 510 may comprise a plurality of memory units. At least one of the plurality of memory units may be used as a buffer memory for buffering data while processing.

The object detector 512 is configured to, over time, detect objects in the wide angle view captured by the monitoring camera 500. As mentioned above an object could for example be an object entering or moving around in the scene depicted in the wide angle view. An object may alternatively be a stationary object in the scene. Objects may be detected by detecting motion of objects with, for example, a motion detecting algorithm. Detecting objects may also include recognition of objects in the scene. The recognition of objects may be performed using an object recognition algorithm and/or an action recognition algorithm. Further, object detector 512 may attribute each detected object with an object type among a number of predetermined object types. The attributing may be based on the recognition of objects in the scene. Each respective detected object may be allocated a weight. Further, the object detector 512 is further configured to determine positions within the wide angle view of the detected objects. The object detector 512 may further be configured to determine a time of occurrence for respective one of the detected objects.

The area of interest determining unit 514 is configured to determining one or more areas of interest within the scene based on the determined positions of the objects. The area of interest determining unit 514 may further be configured to determine an overall density distribution of positions of objects within the scene, and defining an area of interest as an area having a density of positions of objects above a threshold value. The determining of the overall density distribution may further be based on the weights of the objects.

The splitting boundary determining unit 516 is configured to determine splitting boundaries for the plurality of display views in the wide angle view such that the splitting boundaries avoid the one or more areas of interest. The splitting boundary determining unit 516 may be configured to apply splitting boundaries in the wide angle view such that a center of gravity of a local density distribution of positions of objects within a specific display view is centered in the specific display view. The splitting boundary determining unit 516 may further be configured to determine splitting boundaries in the wide angle view by taking into account the respective time of occurrence for the detected objects, and by targeting that occurrences of detected objects are simultaneous in least possible display views.

The person skilled in the art realizes that the present teachings by no means is limited to the embodiments described above. On the contrary, many modifications and variations are possible within the scope of the appended claims.

For example, the calibration of the splitting boundaries may be performed continuously depending on scene changes. Alternatively, the splitting of the boundaries may also be changed periodically according to a schedule if statistics show that activity in the scene varies periodically.

Further, the motion detection within the wide angle view may be performed using lens distortion data of the wide angle lens used for capturing the wide angle view.

Moreover, instead of being performed by a monitoring camera, any other device having an object detector 512, an area of interest determining unit 514, and a splitting boundary determining unit 516 according to the above may be used for splitting a wide angle view of a scene into a plurality of display views.

Additionally, variations to the disclosed embodiments can be understood and effected by the skilled person in practicing the present teachings, from a study of the drawings, the disclosure, and the appended claims.

What is claimed is:

1. A method for splitting a wide angle view of a scene into a plurality of display views, each display view corresponding to a portion of the wide angle view delimited by splitting boundaries, wherein the wide angle view is captured by a wide angle lens camera, the method comprising:

detecting, over a predetermined or dynamic period of time, objects in the scene depicted in the wide angle view, wherein the detecting objects in the scene comprises recognizing objects in the scene;

attributing each detected object with an object type among a number of predetermined object types based on the recognition of objects in the scene and allocating a weight to a respective detected object based on the object type for the respective detected object;

determining positions of the detected objects within the scene;

determining one or more areas of interest within the scene based on the determined positions of the objects; and determining the splitting boundaries for the plurality of display views in the wide angle view such that the splitting boundaries avoid the one or more areas of interest, wherein the determining one or more areas of interest comprises determining an overall density distribution of positions of objects within the scene, and defining an area of interest as an area having a density of positions of objects above a threshold value, wherein the determining the overall density distribution is further based on the weights of the objects.

2. The method according to claim 1, wherein the detecting objects in the scene comprises detecting motion in the scene.

3. The method according to claim 1, wherein the detecting objects in the scene comprises recognition of objects in the scene.

4. The method according to claim 1, wherein the determining splitting boundaries in the wide angle view is further performed such that a center of gravity of a local density distribution of positions of objects within a specific display view is centered in the specific display view.

5. The method according to claim 1, wherein the detecting objects in the scene is performed for at least 30 minutes.

6. The method according to claim 1, further comprising:

determining a time of occurrence for respective one of the detected objects, wherein the determining splitting boundaries in the wide angle view is further performed by taking into account the respective time of occurrence for the detected objects, and by targeting that occurrences of detected objects are simultaneous in least possible display views.

7. The method according to claim 1, wherein the method is forming part of a calibration mode of the camera, wherein the calibration mode occurs outside of a normal operating mode of the camera, and wherein the camera is set to be in the calibration mode during a predetermined time period.

8. The method according to claim 7, wherein the predetermined time period is at least 30 minutes.

9. The method according to claim 1, wherein the method is forming part of a calibration mode of the camera and wherein the camera is set to be in the calibration mode until a predetermined number of objects have been detected.

10. The method according to claim 1, wherein the method is forming part of a calibration mode of the camera and wherein the camera is set to be in the calibration mode until a predetermined number of objects have been detected within a potential area of interest.

11. The method according to claim 1, wherein the plurality of display views is at least three.

12. The method according to claim 1, further comprising dewarping the display views and displaying the dewarped display views.

13. A monitoring camera comprising:

a memory;

a lens configured to capture a wide angle view of a scene; and one or more processors configured to:

detect, over a predetermined or dynamic period of time, objects in the scene depicted in a wide angle view, wherein the detecting objects in the scene comprises recognition of objects in the scene;

attribute each detected object with an object type among a number of predetermined object types based on the recognition of objects in the scene and allocate a weight to a respective detected object based on the object type for the respective detected object;

determine positions of the detected objects within the scene;

determine one or more areas of interest within the scene based on the determined positions of the objects, wherein the one or more areas of interest within the scene are determined by determining an overall density distribution of positions of objects within the scene and defining an area of interest as an area having a density of positions of objects above a threshold value, wherein the determining the overall density distribution is further based on the weights of the objects;

determine splitting boundaries for a plurality of display views in the wide angle view such that the splitting boundaries avoid the one or more areas of interest; and split the wide angle view of the scene into a plurality of display views, wherein the wide angle view of the scene is split using the determined splitting boundaries, each display view corresponding to a portion of the wide angle view delimited by the determined splitting boundaries.

* * * * *